(No Model.)
H. D. NORTHUP.
AUTOMATIC ALE TAP AND FAUCET.
No. 409,059. Patented Aug. 13, 1889.
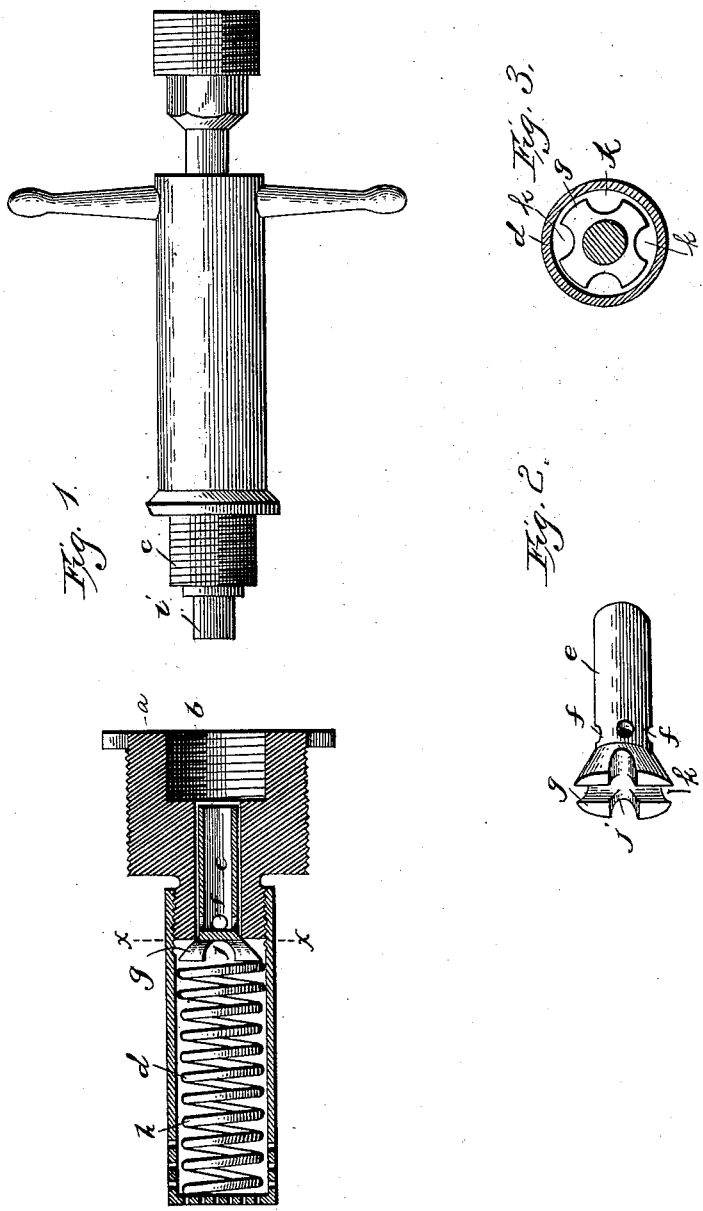
Witnesses:
John Enders
H. E. Pecks
Inventor
H. Davis Northup
per O. E. Duffy
Attorney.

UNITED STATES PATENT OFFICE.

H. DAVIS NORTHUP, OF FORT EDWARD, NEW YORK.

AUTOMATIC ALE TAP AND FAUCET.

SPECIFICATION forming part of Letters Patent No. 409,059, dated August 13, 1889.

Application filed March 28, 1889. Serial No. 305,086. (No model.)

*To all whom it may concern:*

Be it known that I, H. DAVIS NORTHUP, of Fort Edward, in the county of Washington and State of New York, have invented certain new and useful Improvements in Automatic Ale Taps and Faucets; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to improvements in cocks and couplings for barrels, kegs, and the like; and the invention consists in certain novel features of construction and combinations of parts, more fully described hereinafter, and particularly pointed out in the claim.

Referring to the accompanying drawings, Figure 1 is a view of the complete device, the plug-section, valve, &c., being shown in longitudinal section, and the screw-section or nut in elevation. Fig. 2 is a detail perspective view of the valve. Fig. 3 is a cross-section, taken on the plane of $x\ x$, Fig. 1, looking inwardly.

In the drawings, the reference-letter $a$ indicates a plug-section externally screw-threaded to screw into the bung-hole of a barrel or keg. This plug-section, as usual, is provided with a longitudinal bore $b$, the outer end of which is enlarged and internally screw-threaded to receive the threaded end of the nut or screw-section $c$, provided with a longitudinal bore adapted to be held in continuity with the bore of the plug. Upon its inner end the plug is provided with an externally-threaded extension, upon which a cylindrical chamber $d$ is screwed, so that its inner end will extend into the fluid in the barrel or vessel, and the bore of the plug will open into the interior of the chamber. A valve is located in and normally closes communication between this chamber and bore of the plug, said valve consisting of a hollow stem $e$, open at its outer end and extending almost to the outer end of the bore of the plug, and near its inner end provided with a series of radial inlet-openings $f$, as usual, and upon the inner end of this hollow stem within the cylindrical chamber the beveled valve $g$ is located, the beveled sides of said valve normally bearing against the end edges of and normally closing the outer end of the bore $b$. This valve is yieldingly held to its seat, closing the end of said bore by a stiff coiled spring $h$, located within said chamber, at one end bearing against the outer closed end of the chamber and at the opposite end against the outer end of the valve. The outer end of the chamber is provided with a suitable number of inlets, as usual.

The screw-section or nut is provided with a pipe-section $i$, extending through and beyond the bore of the same, so that when it is desired to draw liquid from the vessel the end of the pipe-section extending from the threaded end of the nut is inserted in the outer end of the bore $b$, and the nut screwed into the internally-threaded chamber of the plug, the end of the pipe engaging the end of the valve-stem and forming a tight joint between the same and gradually forcing the valve-stem in and the valve from its seat against the tension of the spring, until the portion of the stem having the inlet-apertures $f$ is moved out of the plug-bore into the cylindrical chamber, so that the fluid passes from the chamber through the apertures $f$ into and through the valve-stem and pipe-section.

In order to hold the valve to its seat with sufficient pressure, a spring of considerable size and stiffness is required. Usually the diameter of the spring is nearly, if not the same, as the internal diameter of the cylindrical chamber; hence the fluid usually passes up through the space within the center of the spring, and, as in the devices of this construction heretofore used, the end of the valve was extended and reduced, and this reduced end was embraced by the upper end of the spring, or the end of the valve is flat and forms a square shoulder, against which the end of the spring presses. In passing to the apertures $f$ the fluid had to pass between the coils of the spring, which are usually close together, and through the exceedingly narrow annular space between the outer edge of the valve above the spring and the inner surface of the cylindrical chamber, whereby the passage of the fluid was not direct and clear, and the small spaces and narrow passages were exceedingly apt to and always did become clogged and closed by sediment, hops, &c., in the fluid; hence the object of my invention is to provide, and my present invention consists in, a peculiarly-constructed valve, which will avoid these objections and thereby increase the effectiveness of the device, and form a direct and clear passage for the fluid to the inlet-apertures of the stem, and prevent the passages from becoming clogged or choked, and thereby avoiding the difficulty which rendered these old devices inoperative and impracticable. With this object in view the old and extended and reduced end of the valve is dispensed with, so that the spring bears directly against the end of the valve, which end or face of the valve against which the spring bears is provided with one or more deep transverse grooves or channels $j$, extending completely across the same, (two grooves are shown in the present instance, extending at right angles to each other,) thereby forming direct radial channels from the space within the spring to the space between the valve and inner space of the chamber, and on account of the tapered form the valve and the depth of the groove or grooves longitudinal channels $k$ (see Fig. 3) are also formed between the inner surface of the chamber and the valve, thereby forming direct passages to each aperture $f$, as the end of each groove $j$ is located directly below or in line with an opening $f$; hence direct passages are formed from the cylindrical space within the spring laterally and then longitudinally and directly to said inlet-apertures of the valve-stem.

This present invention is an improvement on the construction of Linindoll's patent, No. 341,339, issued May 4, 1886, and is the outcome of long practical experience with the device of this patent and with the construction of Linindoll's application, Serial No. 226,519, allowed January 23, 1889.

What I claim is—

In a combined cock and coupling, the combination of the plug having a bore, a cylindrical chamber on the inner end of the plug having induction-openings, a valve consisting of the tapered valve proper in said chamber, adapted to close the outer end of said bore and provided with the hollow stem extending into the bore and provided with inlet-apertures, and a coiled spring in said chamber and bearing against the end of said valve, said end face of the tapered valve having one or more deep transverse channels, forming lateral passages from the space within the spring, and longitudinal passages to said inlet-openings of the valve-stem, substantially as described.

In testimony that I claim the foregoing as my own I affix my signature in presence of two witnesses.

H. DAVIS NORTHUP.

Witnesses:
 JOHN ENDERS, Jr.,
 O. E. DUFFY.